(12) United States Patent
Weidauer et al.

(10) Patent No.: US 9,199,427 B2
(45) Date of Patent: Dec. 1, 2015

(54) PAD OF LABELS FOR USE ON STORE SHELVES IN A RETAIL ENVIRONMENT

(71) Applicant: Electronic Imaging Services, Inc., Little Rock, AR (US)

(72) Inventors: Jeffrey Weidauer, Little Rock, AR (US); Michael Wilkinson, Overland Park, KS (US); Jeffrey Blackwell, Maumelle, AR (US); Gene Bethards, Benton, AR (US); Scott Aten, Little Rock, AR (US); David Adler, Interlaken, NJ (US)

(73) Assignee: Electronic Imaging Services, Inc., Little Rock, AR (US)

( * ) Notice: Subject to any disclaimer, the term of this patent is extended or adjusted under 35 U.S.C. 154(b) by 0 days.

(21) Appl. No.: 14/082,319

(22) Filed: Nov. 18, 2013

(65) Prior Publication Data

US 2014/0367471 A1 Dec. 18, 2014

Related U.S. Application Data

(60) Provisional application No. 61/835,219, filed on Jun. 14, 2013, provisional application No. 61/880,410, filed on Sep. 20, 2013.

(51) Int. Cl.
G06K 19/06 (2006.01)
B31D 1/02 (2006.01)
(Continued)

(52) U.S. Cl.
CPC ............ *B31D 1/021* (2013.01); *B31D 1/026* (2013.01); *B31D 1/027* (2013.01); *B32B 37/12* (2013.01); *G06K 19/06028* (2013.01); *G06K 19/06046* (2013.01); *G09F 3/02* (2013.01); *G09F 3/10* (2013.01); *B32B 38/0004* (2013.01); *B32B 38/1825* (2013.01); *B32B 2307/732* (2013.01); *B32B 2317/12* (2013.01); *B32B 2323/10* (2013.01); *B32B 2367/00* (2013.01); *B32B 2383/00* (2013.01); *B32B 2519/00* (2013.01); *G09F 2003/023* (2013.01);
(Continued)

(58) Field of Classification Search
CPC .......... B42D 3/002; B42D 1/008; B42D 1/10; G06K 3/02
USPC .................. 235/488; 705/20, 21; 281/21.1
See application file for complete search history.

(56) References Cited

U.S. PATENT DOCUMENTS

| 237,223 A | 2/1881 | Wight |
|---|---|---|
| 3,615,474 A | 10/1971 | Rosenberger |

(Continued)

FOREIGN PATENT DOCUMENTS

| WO | 97/05556 | 2/1997 |
|---|---|---|
| WO | WO 2012/009755 A1 | 1/2012 |

OTHER PUBLICATIONS

International Search Report for PCT/US2014/042271.
(Continued)

*Primary Examiner* — Allyson Trail
(74) *Attorney, Agent, or Firm* — Morgan Lewis & Bockius LLP

(57) ABSTRACT

A pad of labels for use on store shelves in a retail environment. The pad of labels include labels with adhesive strips applied to a bottom surface of each label and a top laminate layer with a release coating applied to the top surface of each label. The labels in the pad are sequenced according to a store's planogram.

33 Claims, 9 Drawing Sheets

(51) Int. Cl.
  *G09F 3/02* (2006.01)
  *G09F 3/10* (2006.01)
  *B32B 37/12* (2006.01)
  *B32B 38/00* (2006.01)
  *B32B 38/18* (2006.01)

(52) U.S. Cl.
  CPC .............. *G09F 2003/0208* (2013.01); *G09F 2003/0214* (2013.01); *Y10T 156/10* (2015.01); *Y10T 156/1052* (2015.01); *Y10T 156/1057* (2015.01)

(56) References Cited

U.S. PATENT DOCUMENTS

| | | | |
|---|---|---|---|
| 3,630,513 | A | 12/1971 | Davidson, Jr. |
| 3,658,364 | A | 4/1972 | Da Mert |
| 3,660,187 | A | 5/1972 | Shortway et al. |
| 3,663,007 | A | 5/1972 | Preiter |
| 3,692,301 | A | 9/1972 | Wetter |
| 3,802,955 | A | 4/1974 | Powanda et al. |
| 3,816,232 | A | 6/1974 | Meiser |
| 3,912,569 | A | 10/1975 | Kapral |
| 4,015,837 | A | 4/1977 | Ostler |
| 4,029,310 | A | 6/1977 | Reist |
| 4,259,788 | A | 4/1981 | Wilson |
| 4,265,437 | A | 5/1981 | Reist et al. |
| 4,277,427 | A | 7/1981 | Kaminski et al. |
| 4,278,483 | A | 7/1981 | Mansolillo |
| 4,281,762 | A | 8/1981 | Hattemer |
| 4,284,453 | A | 8/1981 | Endrizzi |
| 4,302,497 | A | 11/1981 | Toyooka et al. |
| 4,307,830 | A | 12/1981 | Didde |
| 4,409,870 | A | 10/1983 | Rynik et al. |
| 4,452,114 | A | 6/1984 | Rynik et al. |
| 4,533,132 | A | 8/1985 | Wangermann |
| 4,590,109 | A | 5/1986 | Holmberg |
| 4,759,797 | A | 7/1988 | Umeda et al. |
| 4,796,556 | A | 1/1989 | Bird |
| 4,841,903 | A | 6/1989 | Bird |
| 5,021,273 | A | 6/1991 | Kobayashi |
| 5,031,773 | A | 7/1991 | Manico et al. |
| 5,050,792 | A * | 9/1991 | Segall ............................ 229/68.1 |
| 5,172,314 | A | 12/1992 | Poland et al. |
| 5,182,152 | A | 1/1993 | Ericson et al. |
| 5,209,807 | A * | 5/1993 | Fry ................................ 156/470 |
| 5,244,525 | A | 9/1993 | Neuwirh et al. |
| 5,248,135 | A | 9/1993 | Leu |
| 5,284,689 | A | 2/1994 | Laurash et al. |
| 5,293,698 | A | 3/1994 | Petersen |
| 5,324,078 | A | 6/1994 | Bane |
| 5,397,117 | A | 3/1995 | Mertens |
| 5,407,729 | A | 4/1995 | Verden et al. |
| 5,518,762 | A | 5/1996 | Soltysiak et al. |
| 5,628,501 | A | 5/1997 | Meier |
| 5,671,006 | A | 9/1997 | Billiot |
| 5,674,334 | A | 10/1997 | Instance |
| 5,682,698 | A | 11/1997 | Bevins |
| 5,707,713 | A | 1/1998 | Langan et al. |
| 5,709,297 | A | 1/1998 | Brandriff et al. |
| 5,727,890 | A | 3/1998 | Stodder et al. |
| 5,730,056 | A | 3/1998 | Schmitt |
| 5,751,919 | A | 5/1998 | Goodwin, III |
| 5,803,260 | A | 9/1998 | Tilton |
| 5,810,347 | A | 9/1998 | Wingate |
| 5,819,655 | A | 10/1998 | Dellivenneri et al. |
| 5,846,582 | A | 12/1998 | Mayfield et al. |
| 5,964,149 | A | 10/1999 | Venneri et al. |
| 5,967,343 | A | 10/1999 | Dufresne |
| 6,016,913 | A | 1/2000 | Tilton |
| 6,040,026 | A | 3/2000 | Iwabuchi et al. |
| 6,045,893 | A | 4/2000 | Fukushima et al. |
| 6,050,192 | A | 4/2000 | Kipphan et al. |
| 6,071,583 | A | 6/2000 | Pomerantz |
| 6,074,747 | A | 6/2000 | Scholz et al. |
| 6,089,777 | A | 7/2000 | Wong |
| 6,105,955 | A | 8/2000 | Rawlings et al. |
| 6,106,917 | A | 8/2000 | Pereira et al. |
| 6,119,594 | A | 9/2000 | Kipphan et al. |
| 6,145,232 | A | 11/2000 | Bevins |
| 6,163,996 | A | 12/2000 | Gebka |
| 6,179,335 | B1 | 1/2001 | DeLise, Jr. |
| 6,186,555 | B1 | 2/2001 | Rawlings |
| 6,217,443 | B1 | 4/2001 | Green, Jr. |
| 6,254,955 | B1 | 7/2001 | Kuo et al. |
| 6,269,342 | B1 * | 7/2001 | Brick et al. ..................... 705/20 |
| 6,281,795 | B1 | 8/2001 | Smith et al. |
| 6,286,871 | B1 | 9/2001 | Spector et al. |
| 6,360,465 | B1 | 3/2002 | Simpson |
| 6,364,363 | B1 | 4/2002 | Stober et al. |
| 6,385,885 | B1 | 5/2002 | Valiulis |
| 6,403,189 | B1 | 6/2002 | Donahue |
| 6,408,553 | B1 | 6/2002 | Brown et al. |
| 6,488,999 | B1 * | 12/2002 | Flynn et al. ................... 428/42.2 |
| 6,579,585 | B1 | 6/2003 | Garvic et al. |
| 6,627,285 | B2 | 9/2003 | Kuo et al. |
| 6,632,316 | B1 | 10/2003 | Garvic |
| 6,701,653 | B2 | 3/2004 | Chess et al. |
| 6,703,096 | B2 * | 3/2004 | Sabella ......................... 428/40.1 |
| 6,817,127 | B2 | 11/2004 | Gottlieb et al. |
| 6,897,763 | B2 | 5/2005 | Schulmerich et al. |
| 6,926,942 | B2 | 8/2005 | Garvic et al. |
| 6,981,343 | B2 | 1/2006 | Rawlings et al. |
| 7,191,951 | B2 | 3/2007 | Hanyu et al. |
| 7,287,001 | B1 | 10/2007 | Falls et al. |
| 7,309,731 | B2 | 12/2007 | Shih et al. |
| 7,340,855 | B2 | 3/2008 | Wiltfang et al. |
| D576,485 | S | 9/2008 | Koza |
| 7,426,798 | B2 | 9/2008 | Koomen et al. |
| 7,440,903 | B2 | 10/2008 | Riley et al. |
| 7,533,036 | B2 | 5/2009 | Bamberg et al. |
| D608,395 | S | 1/2010 | Engelby et al. |
| D623,235 | S | 9/2010 | Engelby et al. |
| D623,236 | S | 9/2010 | Engelby et al. |
| 7,802,388 | B2 | 9/2010 | Henkel et al. |
| D630,257 | S | 1/2011 | Engelby et al. |
| 7,885,865 | B2 | 2/2011 | Benson et al. |
| 7,957,998 | B2 | 6/2011 | Riley et al. |
| 7,975,416 | B2 | 7/2011 | Engelby et al. |
| 7,992,334 | B1 | 8/2011 | Engelby et al. |
| 8,011,126 | B2 | 9/2011 | Nunez et al. |
| 8,020,765 | B2 | 9/2011 | Nunez et al. |
| 8,171,663 | B2 | 5/2012 | Engelby et al. |
| 8,261,477 | B1 | 9/2012 | Wilkinson et al. |
| 8,302,338 | B2 | 11/2012 | Engelby et al. |
| 8,322,062 | B1 | 12/2012 | Engelby et al. |
| D676,484 | S | 2/2013 | Bratter et al. |
| D676,485 | S | 2/2013 | Bratter et al. |
| D676,490 | S | 2/2013 | Bratter et al. |
| 8,528,731 | B2 * | 9/2013 | Bratter et al. ................ 206/447 |
| 8,613,156 | B2 | 12/2013 | Nunez et al. |
| 8,626,613 | B2 | 1/2014 | Dale et al. |
| 8,762,212 | B2 | 6/2014 | Falls et al. |
| 8,806,787 | B2 | 8/2014 | Engelby et al. |
| 8,910,864 | B2 | 12/2014 | Falls et al. |
| 8,928,923 | B2 | 1/2015 | Nunez |
| 2002/0138372 | A1 | 9/2002 | Ludtke |
| 2002/0198892 | A1 | 12/2002 | Rychel et al. |
| 2004/0101646 | A1 | 5/2004 | Hodson et al. |
| 2005/0081417 | A1 | 4/2005 | Valiulis |
| 2006/0010743 | A1 | 1/2006 | Fowler et al. |
| 2007/0025303 | A1 | 2/2007 | Koomen et al. |
| 2007/0070389 | A1 | 3/2007 | Hidaka |
| 2007/0288296 | A1 | 12/2007 | Lewis |
| 2008/0095963 | A1 | 4/2008 | Robbins |
| 2008/0095964 | A1 | 4/2008 | Wilkinson et al. |
| 2008/0108491 | A1 | 5/2008 | Wilkinson et al. |
| 2008/0164310 | A1 | 7/2008 | Dupuy et al. |
| 2008/0281712 | A1 | 11/2008 | Fuzell-Casey et al. |
| 2009/0234668 | A1 | 9/2009 | Wheeler |
| 2010/0116425 | A1 | 5/2010 | Konsti et al. |
| 2010/0205837 | A1 | 8/2010 | Engelby et al. |
| 2011/0066458 | A1 | 3/2011 | Dale et al. |
| 2011/0232144 | A1 | 9/2011 | Engelby et al. |

(56) References Cited

U.S. PATENT DOCUMENTS

| | | |
|---|---|---|
| 2011/0259775 A1 | 10/2011 | Bratter et al. |
| 2011/0283578 A1 | 11/2011 | Engelby et al. |
| 2012/0022913 A1 | 1/2012 | Volkmann et al. |
| 2012/0250036 A1 | 10/2012 | Hatta et al. |
| 2012/0315422 A1* | 12/2012 | Cushing et al. ............ 428/41.8 |
| 2013/0144757 A1 | 6/2013 | Bauer et al. |
| 2013/0173435 A1 | 7/2013 | Cozad, Jr. |
| 2013/0221651 A1* | 8/2013 | Bratter et al. ............ 281/21.1 |
| 2014/0324736 A1 | 10/2014 | Engelby |
| 2015/0088701 A1 | 3/2015 | Desmarais et al. |

OTHER PUBLICATIONS

ADCO Marketing; Post-it Custom Printed Pop-Up Notes; https://web.archive.org/web/20111114143246/http://www.adcomarketing.com/Product/Post-It-3M-Pop-up-Notes.aspx, Nov. 14, 2011.

Executive White Paper: Time, Money and the Customer Experience (Vestcom International, Inc.) (Jan. 2009).

White Paper: The "Single-Pass" Shelf Part 1 (Vestcom) (Feb. 2012).

White Paper: The "Single-Pass" Shelf Part 2 (Vestcom) (Feb. 2012).

"On the Cutting Edge", Bob Ingram, Progressive Grocer (Sep. 2013).

* cited by examiner

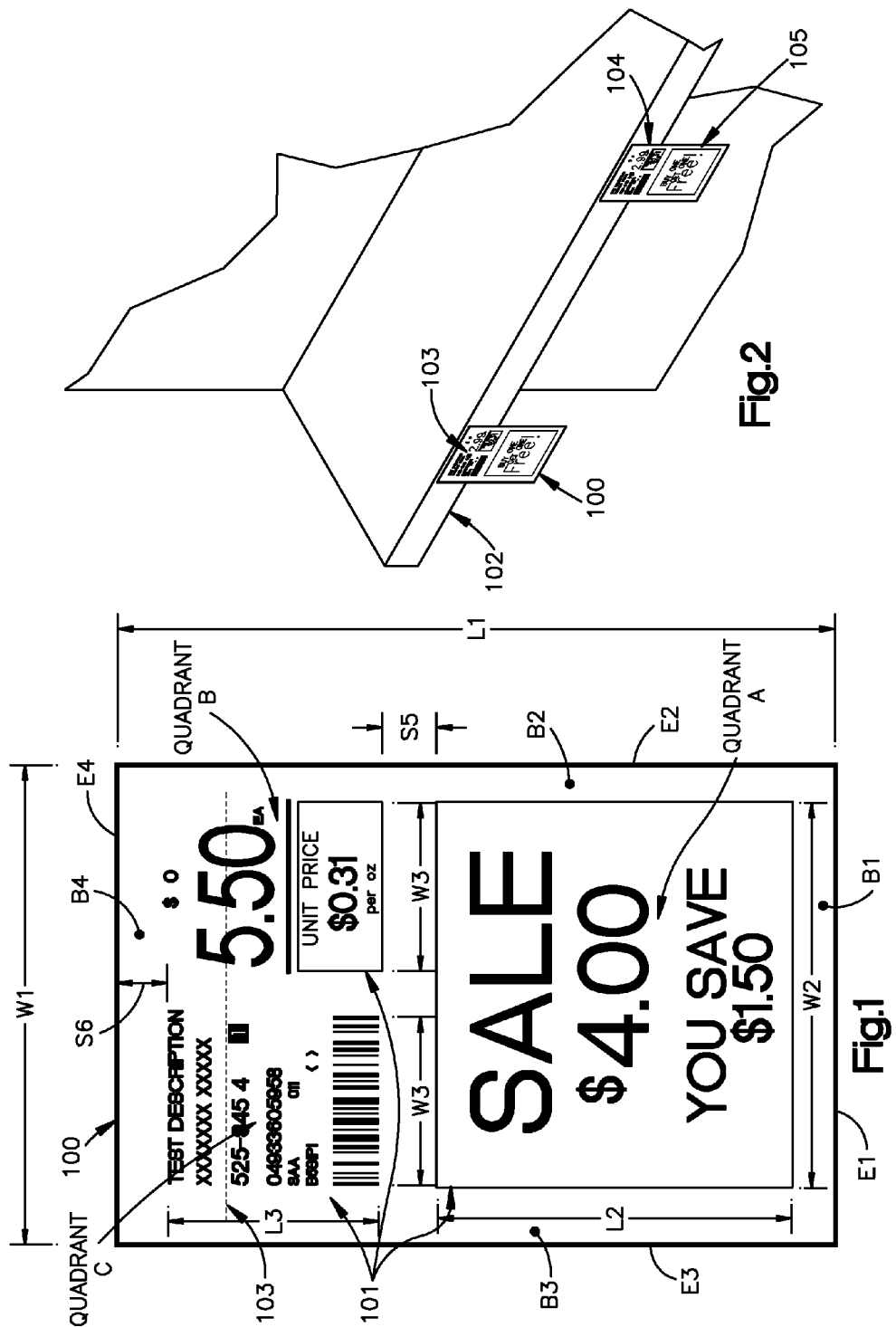

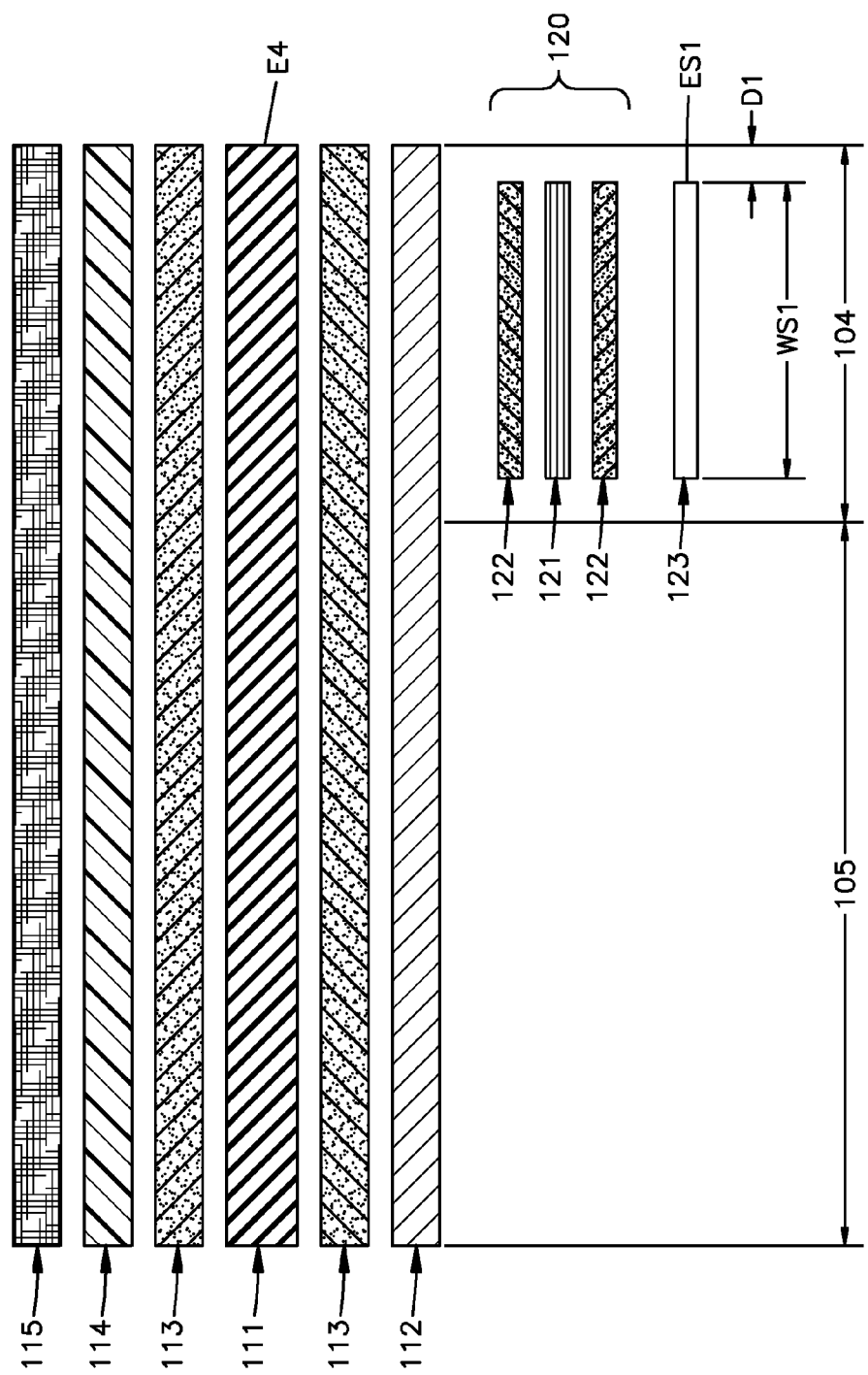

PAD OF LABELS FOR USE ON STORE SHELVES IN A RETAIL ENVIRONMENT

CROSS-REFERENCE TO RELATED APPLICATIONS

This application claims priory to U.S. Patent Application No. 61/835,219, which was filed in the U.S. Patent and Trademark Office on Jun. 14, 2013 and to U.S. Patent Application No. 61/880,410, which was filed in the U.S. Patent and Trademark Office on Sep. 20, 2013.

STATEMENT REGARDING FEDERALLY SPONSORED RESEARCH OR DEVELOPMENT

This application is not the subject of any federally sponsored research or development.

THE NAMES OF THE PARTIES TO A JOINT RESEARCH AGREEMENT

There have been no joint research agreements entered into with any third parties.

FIELD OF THE INVENTION

The embodiments of the present invention relate to a pad of labels for use on store shelves in a retail environment. Specifically, the embodiments of the present invention are directed to a pad of peel-and-stick labels having product specific display information on a top surface, where the labels in the pad are sequenced according to a retail store's planogram.

BACKGROUND OF THE INVENTION

The current practice of updating labels in retail stores involves receiving labels in preprinted sheet format (typically 11-inch by 14-inch sheets) having label-removal perforations. The sheets are typically printed on a paper or vinyl substrate. Each sheet includes approximately 8 to 44 preprinted labels, with label-removal perforations die cut into the sheet, and each label having adhesive on the back covered by a release liner to be removed prior to installing the label on a store shelf. Store personnel must break down the sheets by tearing the sheet along the label-removal perforations to obtain individual labels. Store personnel then sort the individual labels and containerize or bundle them, before distributing and installing the labels on the shelves throughout the store. A person of ordinary skill in the art will readily appreciate that it takes a significant amount of time to break down the sheets into individual labels, to sort them, and to install them on the store's shelves. The store personnel do not take the sheets out to the shelf, i.e., the store personnel typically work in a back office room, break down the sheets, sort them, bring them out to the shelf, verify location and placement of each label, remove the release liner on the back of each label, and apply the label to the shelf.

A single store can average 3,000 to 10,000 price changes per week and receive approximately 300 to 400 sheets at a time. In a recent example, a number of assignee's employees watched store personnel receive, break down, sort, and install its labels based on the approach described above. The store received 10,000 label changes and used two to three employees to receive, break down, sort, and install the labels. The store personnel devoted approximately 86 hours per week to this work; approximately 27 of those hours—roughly 30% of the total time involved—was devoted to breaking down the sheets. Based on a $15 hourly rate, and using 86 total hours for exemplary purposes, the relabeling process cost the store about $1,300 for the week. This store is one of 800 stores in a chain of stores. Thus, if each of the stores in the chain had an average of 10,000 price changes per week, the estimated total cost of label changes is around $1 million per week or $52 million per year. If the store chain can eliminate the approximate 27 hours per week devoted to breaking down sheets of labels, the store chain could save approximately $300,000 per week or $15-16 million per year. That is a significant amount of money. Additionally, the store chain in the example above includes 800 stores throughout the United States. There are approximately 30,000 stores around the country, and even more stores globally, that can benefit from using the embodiments of the present invention, as described in more detail below.

Consequently, a need exists for a labeling system that does not require breaking down, sorting, and containerizing or bundling before the labels can be installed on store shelves. The embodiments of the present invention solve this problem by providing a pad of labels that do not require: (1) breaking down sheets of labels; (2) sorting individual labels; and (3) containerizing or bundling the individual labels.

Furthermore, installation of traditional labels requires that a release liner be peeled from the bottom surface of each label, in order to expose an adhesive strip, before affixing the label to a shelf. The release liner must then be discarded. Thus, a further need exists for a labeling system which does not require store personnel to remove and discard a release liner for each individual label. The embodiments of the present invention solve this further problem by providing a pad of labels without release liners.

SUMMARY OF THE INVENTION

An embodiment of the present invention is directed to a pad of labels for use in a retail store. The pad of labels includes a plurality of labels removably attached to form the pad, where each label comprises a substrate having display information printed on a top surface thereof; an adhesive strip applied to a bottom surface of the label; and a release coating applied to the top surface of the label, where the adhesive strip is removably affixed to the release coating, and where the plurality of labels are sequenced according to the retail store's planogram. The release coating comprises silicone, and preferably the release coating covers the entire surface. The adhesive strip preferably includes double-coated tape having a width in the range of approximately ⅝ inch to 1 inch. For each label, the adhesive strip is permanently applied to the bottom surface of the label in an area that corresponds with a first portion of the label to be affixed to a store shelf. The display information is preprinted on the substrate. The substrate comprises paper, vinyl, plastic films or foils, fabrics, or textiles. The labels are preferably three-inches long and two-inches wide, and are preferably peel and stick labels. The display information includes a plurality of quadrants of information comprising quadrant A General Product Information, quadrant B Unit Price Information, and quadrant C Specific Product Information. The quadrant A information is included in a substantially square box disposed on a lower portion of the label. The substantially square box is approximately 1½-inches long and 1⅝-inches wide, and includes an approximate 3/16-inch border from the lowest horizontal section of the square to an edge E1 of the label and a ⅛-inch border and a 3/16-inch border from the sides of the square to edges E2 and E3, respectively. The quadrant A information includes "Buy One, Get One Free!," "Clearance, $1.00, While Supplies Last," "New Item," or "Sale $xx, You Save $xx," with the "xx" information preferably including certain pricing information. The quadrant B information is included in a substantially rectangular box disposed in an upper right portion of the label having a shaded rectangular box therein with a horizontal line directly above the shaded rectangular box. The substantially rectangular box is preferably approximately ¾-inch wide and approximately 15/16-inch long, and includes an approximate ⅛-inch border B2 to edge E2 and an approximate ⅜-inch border B4 to edge E4. A unit price of information included within the shaded rectangular box is preferably disposed on at least three horizontal lines comprising "UNIT PRICE" on a first line, a specific unit price on a second line, and on a third line words indicating a unit of measure. The quadrant C information is preferably included in a substantially rectangular box disposed in an upper left portion of the label having a bar code within the rectangular box. The substantially rectangular box is approximately ¾-inch wide and approximately 15/16-inch long, and includes an approximate 3/16-inch border B3 to edge E3 and an approximate ⅜-inch border B4 to edge E4. The bar code is preferably horizontal and has an approximate width of ¾ inch.

Another embodiment of the present invention is directed to a pad of labels for use in a retail store comprising a plurality of labels removably attached to form the pad, each label comprising a substrate having display information printed on a top surface thereof; an adhesive strip applied to a bottom surface of the label; and a release coating applied to the top surface of the label, where the adhesive strip is removably affixed to the release coating, where the plurality of labels are sequenced according to the retail store's planogram, and where the display information includes a plurality of quadrants of information including a quadrant A having General Product Information disposed in a lower portion of the label, a quadrant B having Unit Price Information disposed in an upper right portion of the label, and a quadrant C having Specific Product Information disposed in a disposed in an upper left portion of the label.

BRIEF DESCRIPTION OF THE DRAWINGS

Preferred features of the embodiments of the present invention are disclosed in the accompanying drawings, wherein similar reference characters denote similar elements throughout the several views, and wherein:

FIG. 1 is a top view of a label having display information printed on its top surface.

FIG. 2 is a perspective view of a label after installation on a store shelf.

FIG. 3 is a cross-sectional view of a label.

DETAILED DESCRIPTION

Figure 4:
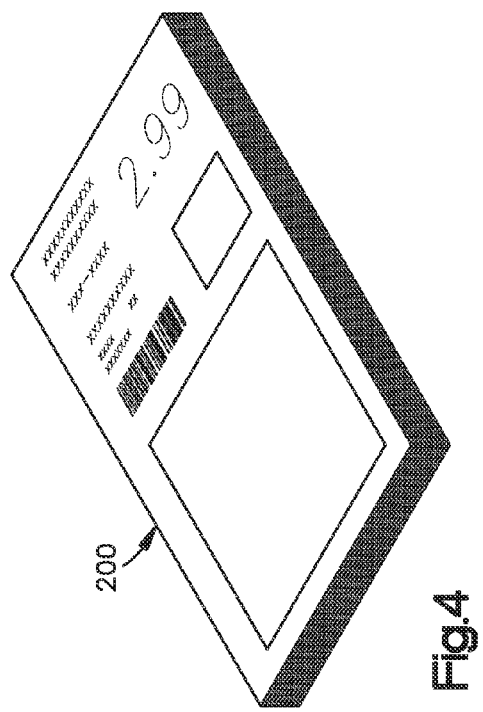
FIG. 4 is a perspective view of a pad of labels.

The embodiments of the present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete and will convey the scope of the invention to those skilled in the art.

In the following description, like reference characters designate like or corresponding parts throughout the figures. Additionally, in the following description, it is understood that terms such as "top," "bottom," "side," "front," "back," "inner," "outer," and the like, are words of convenience and are not to be construed as limiting terms. In addition, the word "approximate" or "approximately" as used in this application means±½ inch.

A person of ordinary skill in the art will understand the meaning of terms of art used throughout this disclosure. Included among these terms is "planogram." The term "planogram" means a diagram, model, or database that contains information regarding where products are placed or displayed for sale within a retail store, including without limitation, the aisle, shelf location, and quantity.

A pad of labels, preprinted and sequenced according to a retail store's planogram is described herein. The embodiments of the present invention are designed to provide a system of labels that does not require: (1) breaking down a sheet of labels by tearing along label-removal perforations; (2) sorting individual labels; and (3) containerizing or bundling the individual labels. Furthermore, because the labels are peeled directly from a pad of peel-and-stick labels, there is no separate release liner utilized that must be removed from each individual label and discarded.

An embodiment of the present invention includes a label 100 as depicted in FIGS. 1-3. Specifically, FIG. 1 shows a label 100 having display information 101 printed so as to be visible on its top surface. The display information 101 includes, without limitation, product information, descriptions, marketing content, store and shelf location, pricing, discounts and promotions, UPCs and bar codes, and effective dates. More specifically, in a preferred embodiment shown in FIG. 1, the label 100 is three inches long (see "L1" on FIG. 1) and two inches wide (see "W1" on FIG. 1).

The label includes at least three quadrants of information. As shown on FIG. 1, quadrant A includes an approximately square box of information within the label 100, the square being 1½-inches long (see "L2" on FIG. 1) and 1⅝-inches wide (see "W2" on FIG. 1), with an approximate 3/16-inch border (B1) from the lowest horizontal section of the square box to the edge (E1) of the label 100. Preferred ⅛-inch (B2) and 3/16-inch (B3) borders from the sides of the square box to the label's edges (E2) and (E3), respectively are provided. The quadrant A includes data related to the overall product such as "Buy One, Get One Free!," "Clearance, $1.00, While Supplies Last," "New Item," and "Sale $xx, You Save $xx." For the purpose of understanding the embodiments of the present invention, the information included in quadrant A is referred to throughout this application and in the claims as "General Product Information."

As shown on FIG. 1, quadrant B includes information generally found in the upper right hand corner of the label 100. Quadrant B is preferably confined in a rectangular area having a width of ¾ inch (see "W3" on FIG. 1) and a length of 15/16 inch (see "L3" on FIG. 1), with preferred ⅛-inch (B2) and ⅜ (B4) borders to the label's edges (E2) and (E4) respectively. More specifically, a preferred embodiment of quadrant B includes specific pricing information such as the unit price for each product such, e.g., "2.99 ea," "3.99 ea," or "5.50 ea." The specific pricing information preferably includes a horizontal line directly under the pricing information, which observes the ⅛-inch border B2 to edge E2 and extends ⅞ inch from edge E2, for a preferred total width of ¾ inch. A unit price of information is included in a preferably shaded rectangular box disposed directly underneath the horizontal line, with the rectangular box having the same or similar ¾-inch width as quadrant B generally (see "W3" on FIG. 1) and a length of ⅜ inch. The unit price information included in the shaded box is preferably provided on three lines of information and includes, for example, "UNIT PRICE" on a first line, preferably in capital letters; on a second line, a specific unit price of, for example, "$0.31;" and on a third line, words indicating a unit of measure, for example "per oz," in small letters. For the purpose of understanding the embodiments of the present invention, the information included in quadrant B is referred to throughout this application and in the claims as "Unit Price Information."

As shown on FIG. 1, quadrant C includes information generally in the upper left hand corner of the label. Quadrant C is preferably confined in a rectangular area having a width of ¾ inch (see "W3" on FIG. 1) and a length of 15/16 inch (see "L3" on FIG. 1), with preferred 3/16-inch (B3) and ⅜-inch (B4) borders to the label's edges (E3) and (E4) respectively. The quadrant C includes specific information about the product and includes a bar code along a horizontal line within the quadrant C that identifies the product. The bar code observes the ⅛-inch border B3 to edge E3 and extends ⅞ inch from edge E3, for a preferred total width of approximately ¾ inch. The quadrant C preferably includes 4-6 other horizontal lines of product-specific information, preferably with no information extending further than ⅞ inch from edge E3. Each of quadrants B and C have a preferred space S5 of ⅜ inch between lower limits of quadrants B and C, and the upper limit of quadrant A. In addition, quadrants B and C are separated by a space S6 that is preferably ⅛ inch wide, and is preferably consistent for the entire length L3 of the quadrants B and C. For the purpose of understanding the embodiments of the present invention, the information included in quadrant C is referred to throughout this application and in the claims as "Specific Product Information." A person of ordinary skill in the art will appreciate that other embodiments may include different sizes and shapes for the quadrants of data therein, not just the square or rectangular shapes shown in FIG. 1.

The embodiment depicted in FIG. 1 also includes one or more relief perforations 103. The relief perforations 103 serve to relieve any "memory" in the lamination materials or substrate of the label 100. The lamination materials or substrate, which are described more fully below, tend to return to their rolled form ("memory"), which can create difficulty when adhering the label 100 to the contoured surfaces of a store shelf 102. The relief perforations 103 relieve this memory, which allows the label 100 to more readily conform to the surface of a store shelf 102.

FIG. 2 shows a label 100 according to an embodiment of the present invention, similar to FIG. 1, except that FIG. 2 shows the label 100 as it appears after installation on a shelf 102 within a retail store. As shown, a first portion 104 of the label 100 is affixed to the shelf 102, while a second portion 105 of the label 100 hangs below the shelf 102 without being affixed to the shelf 102. According to the embodiment, the relief perforations 103 preferably fall along a line parallel to, and approximately centered on, the shelf 102 once the label 100 is in its installed position on the shelf 102. Thus, the relief perforations 103 approximately bisect the first portion 104, which is affixed to the shelf 102, while having a horizontal orientation after the label 100 has been installed on the shelf 102. More specifically, the relief perforations 103 bisect both quadrants B and C, not the area covered by quadrant A.

FIG. 3 shows a cross-sectional view of a label 100 according to a preferred embodiment of the present invention. The label 100 depicted in FIG. 3 includes a paper substrate 111. The paper substrate 111 of FIG. 3 may be a 20 lb bond paper, sourced as sheets measuring 11-inches long and 14-inches wide. However, an array of paper products, available in various weights and provided as continuous rolls or sheets of various sizes, may serve as the paper substrate 111 according to the embodiment of FIG. 3. Furthermore, one skilled in the art will recognize that the substrate material may be chosen from a variety of natural and synthetic materials known within the art, including without limitation, paper, vinyl, plastic films or foils, fabrics, and textiles.

The label 100 of FIG. 3 also includes a layer of adhesive 113 affixing a first layer of lamination material 112 to a bottom surface of the paper substrate 111. According to the embodiment, the first layer of lamination material 112 comprises a layer of polypropylene or polyester film. One skilled in the art, however, will recognize that the first layer of lamination material 112 may be chosen from a variety of lamination materials known in the art. Exemplary polypropylene films include "410" sourced from ACPO, Ltd. and "812C film" sourced from QSPAC Industries, Inc., and an exemplary polyester film is "609" sourced from ACPO, Ltd. These products are clear films that include the layer of adhesive 113 already applied on one surface. Thus, when one of these products is selected for use as the first layer of lamination material 112, affixing the first layer of lamination material 112 involves applying the polypropylene or polyester film to the bottom surface of the paper substrate 111 using the pre-applied adhesive 113. Polypropylene and polyester films provide the advantage of allowing an adhesive strip 120 to permanently adhere to a bottom surface of the first layer of lamination material 112. Thus, the adhesive strip 120 stays entirely on the bottom surface of a label 100 when it is peeled from a pad of labels 200, with no adhesive residue left behind on the top surface of the label 100 directly below.

The label 100 of FIG. 3 includes an adhesive strip 120 affixed to the bottom surface of the first layer of lamination material 112. As previously described, a first portion 104 of the label 100 is to be affixed to the shelf 102, while a second portion 105 of the label 100 hangs below the shelf. Thus, the adhesive strip 120 is preferably applied to the bottom surface of the first layer of lamination material 112 only in an area corresponding to the first portion 104 of the label 100, which is to be affixed to the shelf 102. According to the embodiment of FIG. 3, a first edge of the adhesive strip (ES1) is applied at a distance (D1) ⅛ inch from edge E4. The distance D1 can vary ±1/16 inch. The adhesive strip of the depicted embodiment has a width WS1 ranging from ⅝ inch to 1 inch, and its length continues for the full width W1 of the label 100.

According to the embodiment of FIG. 3, the adhesive strip 120 is a double-coated tape comprising a layer of polyester film 121 having layers of adhesive 122 pre-applied on top and bottom surfaces thereof. Such double-coated polyester tapes provide the advantage that they may be placed over the relief perforations 103, thus reinforcing the relief perforations 103 so that the labels 100 are unlikely to tear. However, one skilled in the art will appreciate that the adhesive strip 120 may be chosen from a variety of materials known in the art, including without limitation, pattern-coated adhesives or double-coated tapes utilizing various substrate materials, such as paper, vinyl, plastic films or foils (including polyester and polypropylene), fabrics, and textiles.

One skilled in the art will recognize that many suppliers offer adhesive strips 120, including double-coated tapes utilizing various materials, that fall within the broader scope of the present invention. But examples of adhesive strips 120 according to the depicted embodiment include "FT 8380" and "FT 9380" products sourced from Avery Denison Corporation. These products are double-coated polyester tapes available in various widths, but commonly sourced in widths ranging from 5/8 inch to 1 inch, and designed for clean removability. Both of these products include a release liner 123 installed on one of its two adhesive surfaces. Yet, the embodiments of the present invention do not incorporate release liners 123. Thus, when one of these products is selected for use as the adhesive, the release liner 123 is removed in the manufacturing process. FT 8380 and FT 9380 are standard adhesive strips 120 that have proven reliable for adhering labels 100 to store shelves 102, while still allowing for any necessary repositioning. The FT 9380 product is a more aggressive adhesive strip 120, suitable for use in applications where label adhesion may present challenges. Selection of these products for use as the adhesive provides the advantage that no changes are necessary with respect to processing and stocking adhesive strips 120, when compared to the production processes for traditional sheets of labels with label-removal perforations. These products also provide the advantage of assuring store personnel that the embodiments of the present invention will provide the adhesive performance to which they are accustomed.

The label 100 of FIG. 3 preferably includes a layer of adhesive 113 affixing a second layer of lamination material 114 to a top surface of the paper substrate 111. According to the embodiment, the second layer of lamination material 114 comprises a layer of polyester film. However, one skilled in the art will recognize that the second layer of lamination material 114 may be chosen from a variety of lamination materials known in the art. The label 100 of FIG. 3 further incorporates a release coating 115 on a top surface of the second layer of lamination material 114. According to the embodiment, the release coating 115 comprises a silicone release coating, which covers the entire top surface of the second layer of lamination material. The release coating 115 allows each label 100 to function as the release liner 123 for the label 100 directly above it. That is, the release coating 115 will allow the adhesive strip 120 permanently affixed to the bottom surface of one label 100 to be cleanly and easily peeled from the top surface of the label 100 directly beneath it, without any risk of tearing the labels 100 or leaving adhesive residue behind.

An exemplary polyester film that, according to the depicted embodiment, may be selected for use as the second layer of lamination material 114 includes "Hostaphan 2SLKN" sourced from Mitsubishi Polyester Film, Inc. This product is a clear polyester film, available in multiple thicknesses and commonly sourced in 92 and 102 gauge thicknesses. Hostaphan 2SLKN comes pre-coated on one surface with a silicone release coating 115. Thus, when Hostaphan 2SLKN is selected for use as the second layer of lamination material 114, adhesive 113 must be applied to the film's surface opposite the silicone release coating 115. Alternatively, the adhesive 113 may be applied to the top surface of the paper substrate 111. The Hostaphan 2SLKN is then applied to the top surface of the paper substrate 111 using the adhesive 113. There is no need to apply a release coating 115 because Hostaphan 2SKLN comes with a silicone release coating 115 pre-applied.

Another embodiment of the present invention includes a pad of labels 200 as depicted in FIG. 4. Specifically, FIG. 4 shows multiple labels 100, according to the above-described embodiment, arranged into a pad 200 such that each individual label 100 may be peeled from the pad 200 and installed directly onto a store shelf 102. Thus, the depicted embodiment potentially eliminates dozens of hours that store personnel traditionally spend each week breaking down sheets of labels by tearing along the label-removal perforations, sorting the individual labels, and containerizing or bundling the individual labels before installation.

The embodiments of the present invention provide further time savings and waste minimization by eliminating the release liner 123 from the individual labels 100. The embodiment depicted in FIG. 4 requires removing a label 100 from the pad of labels 200 and affixing it to the store shelf 102 using the exposed adhesive strip 120. Because the individual labels 100 in the pad 200 adhere to one another without any intermediate release liner 123, the labels 100 are referred to throughout this specification and in the claims as "peel-and-stick." Thus, the embodiments of the present invention eliminate the need for store personnel to peel away and discard a separate release liner 123 before installing a label 100.

Further, the pad of labels 200 depicted in FIG. 4 is preferably sequenced according to a store's planogram. That is, the labels 100 are preferably arranged within the pad 200 by taking into account the store's planogram, such that store personnel tasked with installing the labels 100 need only walk down a store aisle, peel the labels 100 from the pad 200, and affix them to the store shelves 102.

Figure 5:
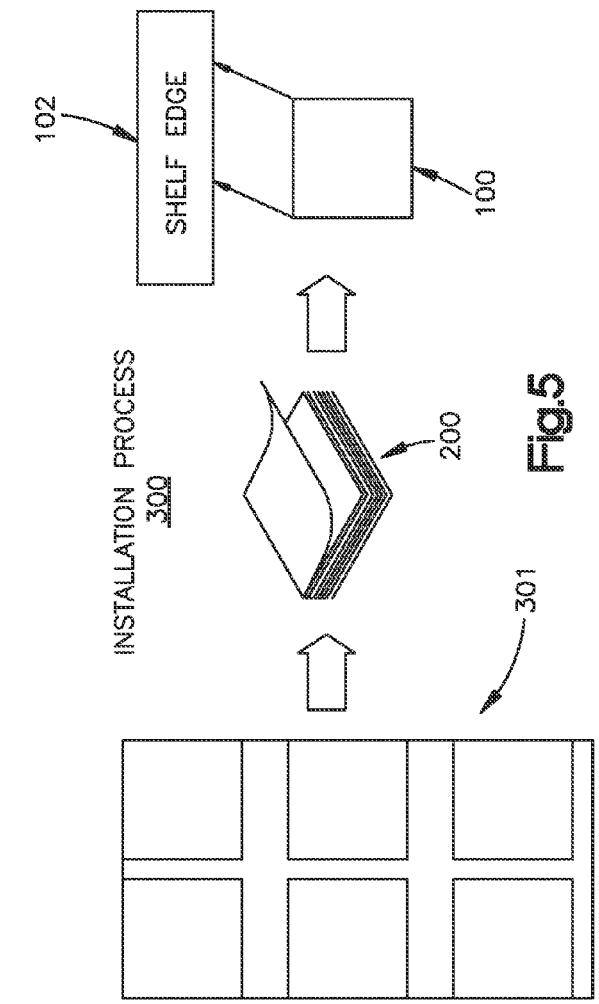
FIG. 5 is a flow diagram for a method of installing labels from a pad of labels.

Another embodiment of the present invention includes a method of installing labels 100 using a pad of labels 200, as depicted in FIG. 5. Specifically, FIG. 5 shows obtaining a pad of labels 200 from a shipping container 301. Next, a label 100 is peeled from the pad of labels 200. Finally, the label 100 is affixed to a store shelf 102 using the exposed adhesive strip 120 on the bottom surface of the label 100.

Further, the installation method depicted in FIG. 5 may utilize a pad of labels 200 wherein the labels 100 are sequenced according to the store's planogram. Thus, the store personnel tasked with installing the labels 100 need only walk down a store aisle, peel the labels 100 from the pad 200, and affix them to the store shelves 102.

Figure 6:
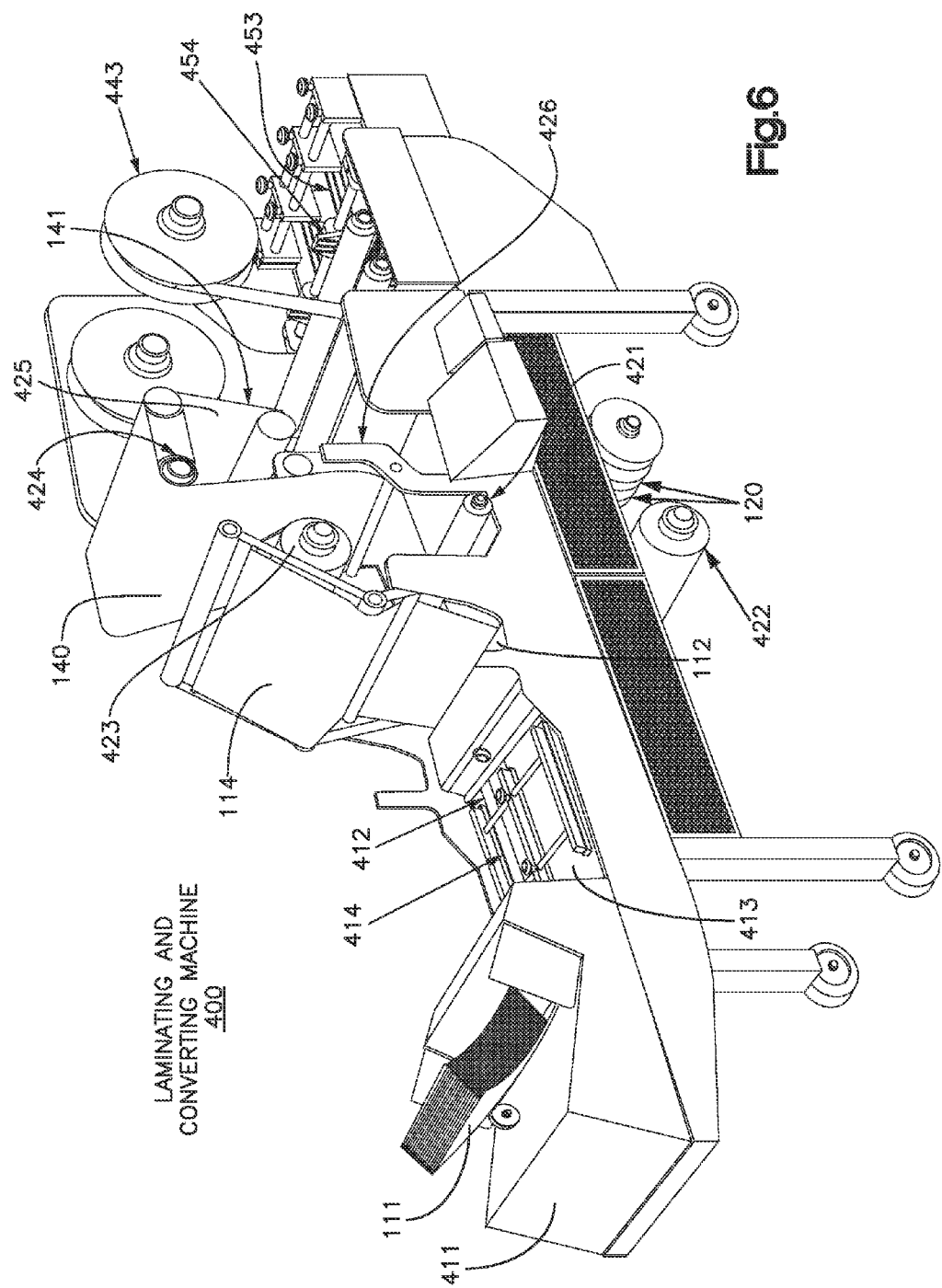
FIG. 6 is a perspective view of a laminating and converting machine that may be used in a method of making a pad of labels.

Another embodiment of the present invention includes a method of making a pad of labels 200, as depicted in FIGS. 6-11. Specifically, FIG. 6 shows a laminating and converting machine 400, such as Vestcom's 9514XLS laminating and converting machine, that may be used to produce a pad of labels 200, according to an embodiment of the present invention. FIGS. 7-11 include detailed stations of the laminating and converting machine shown in FIG. 6.

Figure 7:
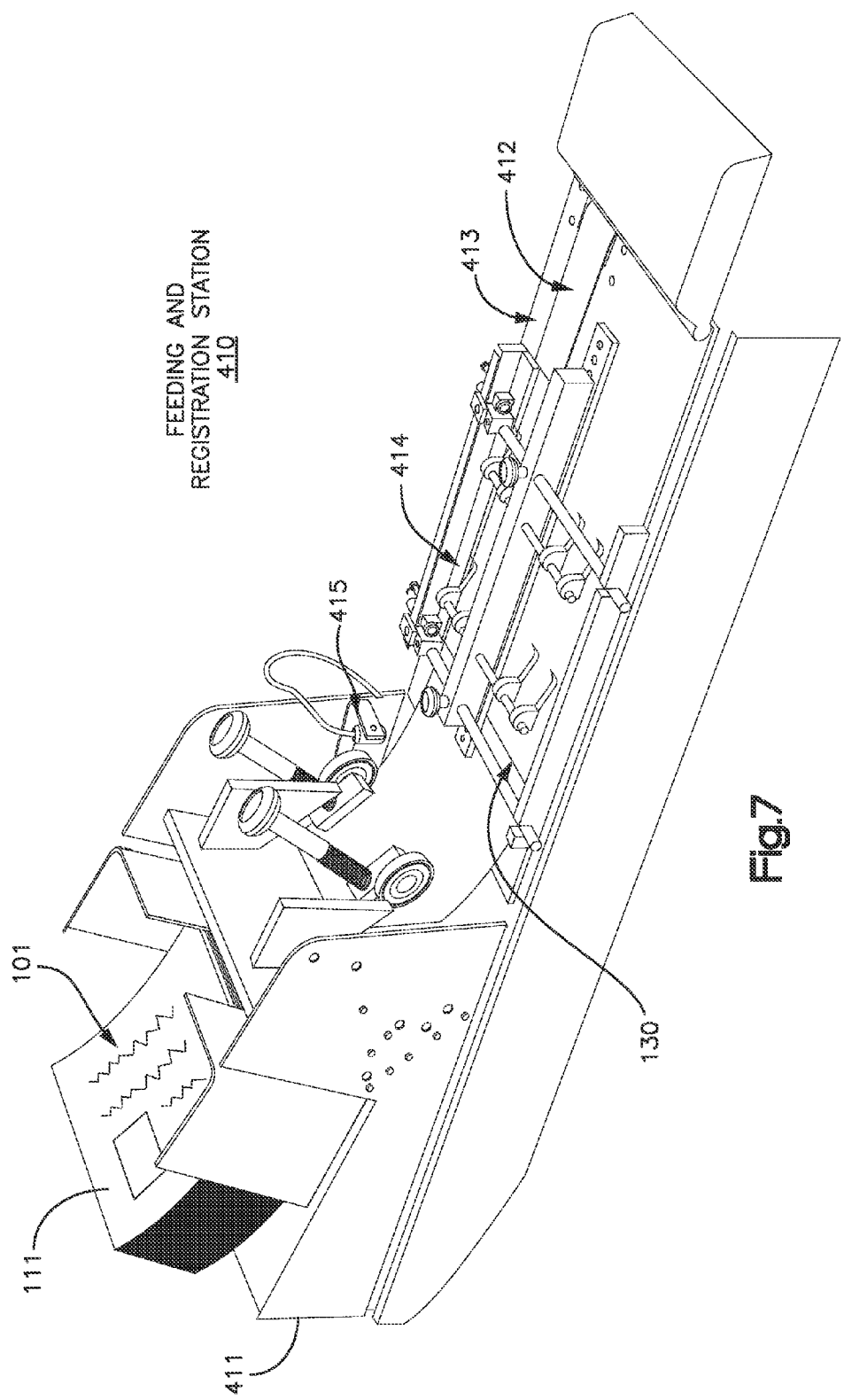
FIG. 7 is a perspective view of a feeding and registration station within the laminating and converting machine.

FIG. 7 shows the process steps associated with a feeding and registration station 410 within the laminating and converting machine 400. Specifically, FIG. 7 shows loading a sheet of paper substrate 111 into a bottom-fed friction feeder 411. One skilled in the art will recognize that a number of feeding mechanisms known in the art may be used in accordance with the present invention to feed substrate material into the laminating and converting machine 400, including without limitation, bottom-fed and top-fed friction feeders. The sheet of paper substrate 111 has preprinted on its top surface display information 101, which may include, without limitation, product information, descriptions, marketing content, store and shelf location, pricing, discounts and promotions, UPCs and bar codes, and effective dates.

The bottom-fed friction feeder 411 feeds the sheet of paper substrate 111 onto belt 412, which carries the sheet of paper substrate 111 along a registration-and-transport table 413. The registration-and-transport table 413 includes adjustable guides 414 to orient the sheet of paper substrate 111. The registration-and-transport table 413 also includes multiple sensors 415 that detect the location of the leading edge 130 of the sheet of paper substrate 111 over time. The laminating and converting machine 600 adjusts the speed of the transport so that the sheet of paper substrate 111 has proper registration as it enters the lamination web.

Figure 8:
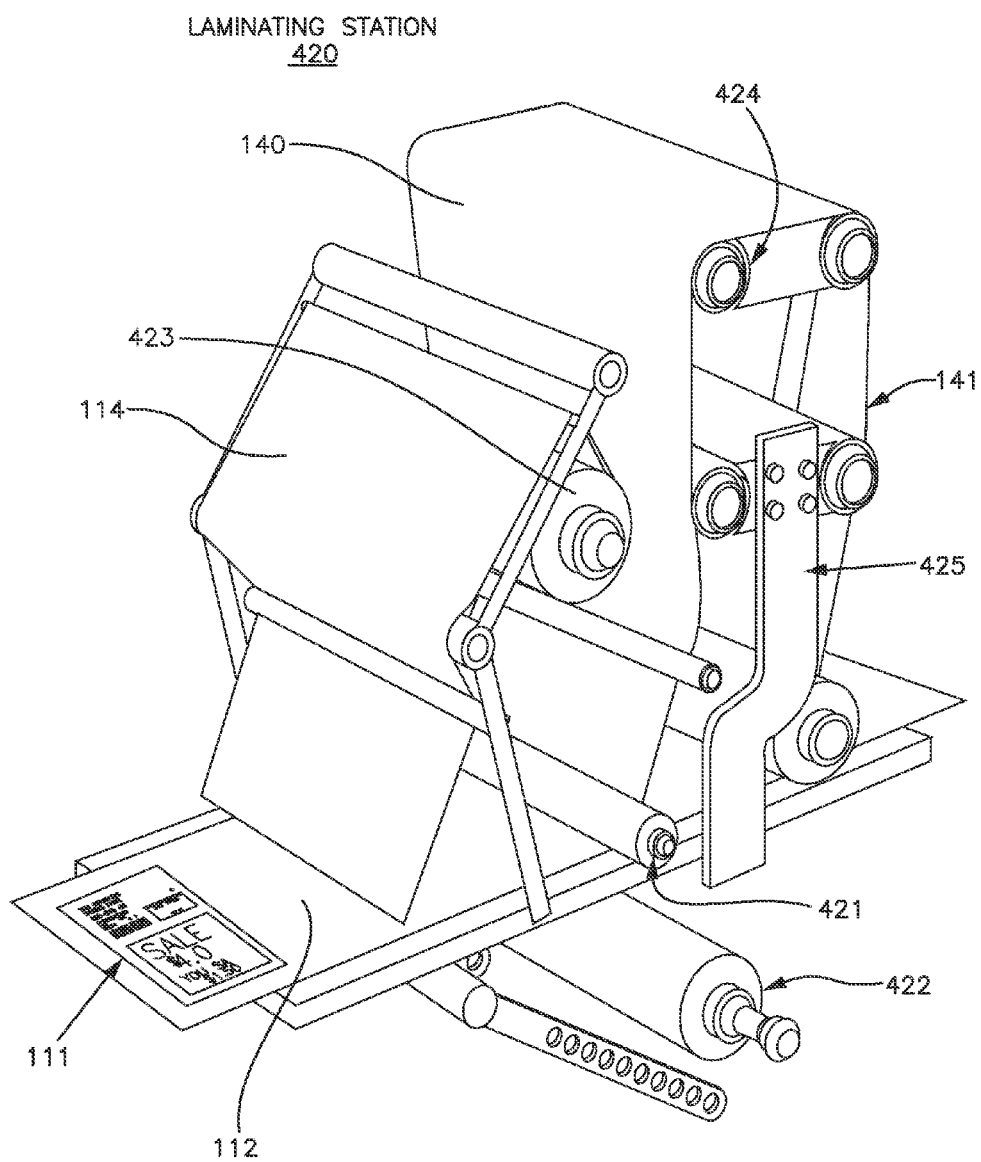
FIG. 8 is a perspective view of a laminating station within the laminating and converting machine.

FIG. 8 shows the process steps associated with a laminating station 420 within the laminating and converting machine 400. Specifically, FIG. 8 shows the sheet of paper substrate 111 entering a first nip roller station 421 where it becomes part of a continuous roll, or web, of material 140.

The sheet of paper substrate 111 joins a roll of polypropylene film, which serves as the first layer of lamination material 112 on the bottom surface of the paper substrate. The roll of polypropylene film is fed from a first laminate station 422. The polypropylene film 112 is affixed to the bottom surface of the paper substrate 111 through use of an adhesive 113. As previously described, the polypropylene film allows an adhesive strip 120 to permanently adhere to the bottom surface of the first layer of lamination material 112. Thus, the adhesive strip 120 stays entirely on the bottom surface of a label 100 when it is peeled from a pad of labels 200, and no adhesive residue is left behind on the top surface of the label 100 directly below.

Additionally, the sheet of paper substrate 111 joins a roll of polyester film, which serves as the second layer of lamination material 114 on the top surface of the paper substrate 111. The roll of polyester film is fed from a second laminate station 423. The polyester film is affixed to the top surface of the paper substrate 111 through use of an adhesive 113. The polyester film forming the second layer of lamination material 114 incorporates a release coating 115 on its top surface. As previously described, the release coating 115 allows the adhesive strip 120 on the bottom surface of one label 100 to be cleanly and easily peeled from the top surface of the label 100 directly beneath it, without any risk of tearing the labels 100 or leaving adhesive residue behind. Accordingly, the sheet of paper substrate 111 is suspended in a web of material 140 created by continuous rolls of lamination material, which will serve as first 112 and second 114 layers of lamination material.

The web of material 140 next travels through a web tensioning station 424 that ensures that proper and consistent tension is maintained in the web 140 throughout the process. A web control guide 425 senses the edge 141 of the web of material 140 and pivots in order to eliminate any skewing and to ensure that the sheet of paper substrate 111 suspended within the web of material 140 enters the die stations in a square position and orientation.

Figure 9:
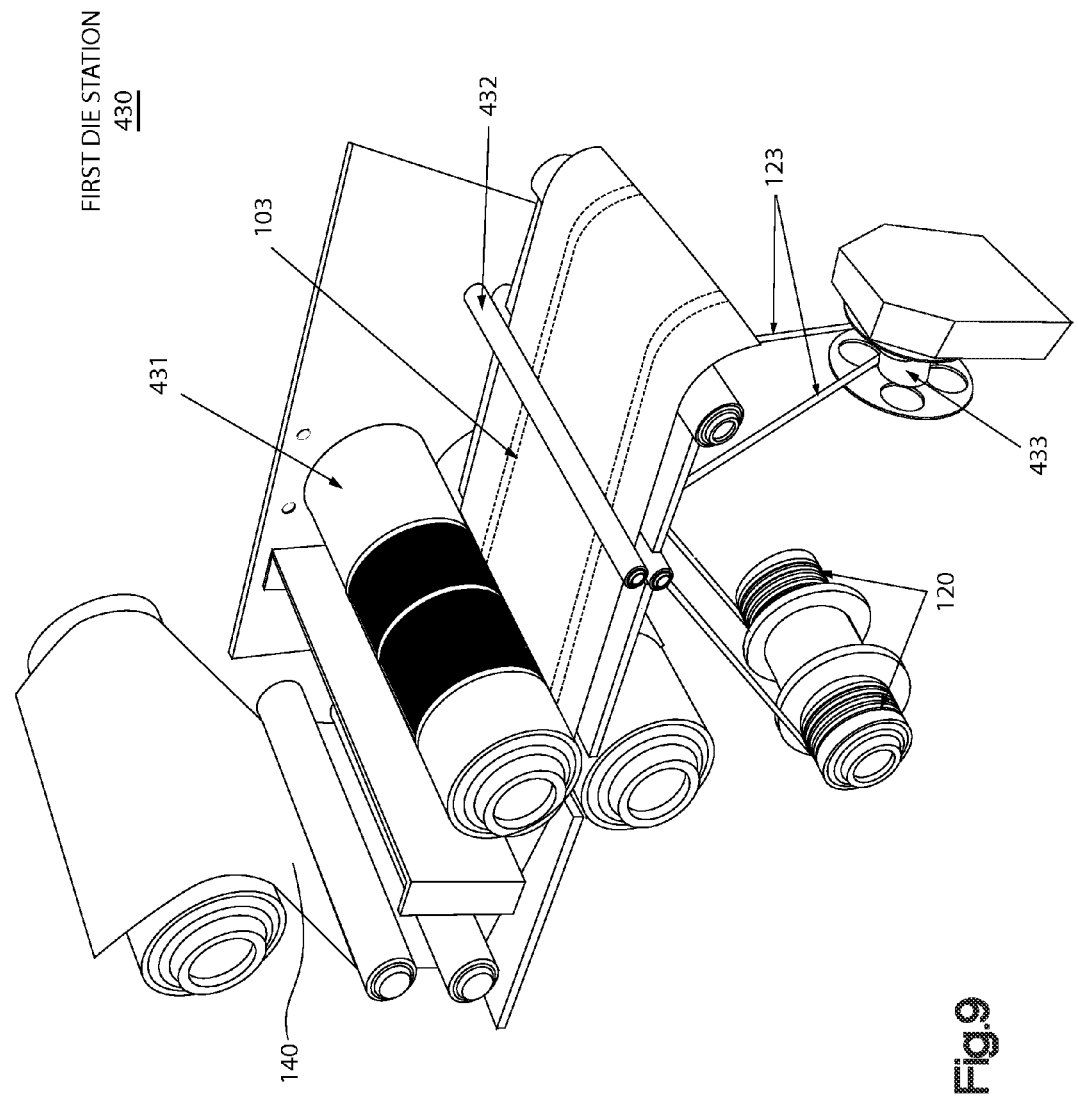
FIG. 9 is a perspective view of a first die station within the laminating and converting machine.

FIG. 9 shows the process steps associated with a first die station 430 within the laminating and converting machine 400. Specifically, FIG. 9 shows the web of material 140 undergoing cutting operations performed by a first die cutter 431. The first die cutter 431 generally creates relief perforations 103 in certain areas of the web of material 140. As previously described, the label's 100 relief perforations 103 preferably fall along a line parallel to, and approximately centered on, the shelf 102 once the label 100 is in its installed position. Consequently, the first die cutter 431 creates the relief perforations 103 at locations on the web of material 140 that will correspond to the appropriate locations for relief perforations 103 in the finished labels 100. The relief perforations 103 relieve any "memory" in the paper substrate 111, first layer of lamination material 112, or second layer of lamination material 114. Thus, the relief perforations 103 added at the first die station 430 will allow the labels 100 to more readily conform to the surface of store shelving 102.

Next, adhesive strips are added to the web of material 140. As previously described, the adhesive strips 120 are double-sided tape and may include a release liner 123. The size and location of the adhesive strips 120 are preferably controlled to ensure that several objectives are met. First, the adhesive strips 120 are added preferably only to areas of the web of material 140 that corresponds to the first portions 104 of the finished labels 100, such that the first portion 104 of a label 100 may be affixed to a store shelf 102 using the adhesive strips 120. Thus, the adhesive strips 120 are not included on the second portion 105 of the label 100, so that the second portion 105 may hang below the store shelf 102 without any exposed adhesive strips 120 that might potentially cling to the bottom surface of the store shelf 102 or to products placed beneath the store shelf 102. Second, the adhesive strips 120 are added only to areas of the web of material 140 that corresponds to the first portions 104 of the finished labels 100, such that for each label 100 in the finished pad of labels 200, only the first portion 104 of the label 100 is removably adhered to the top surface of the label 100 directly below. This allows store personnel to lift or peel the label 100 from the pad of labels 200 using the second portion 105 of the label 100, which has no adhesive strip 120 on its bottom surface, and thus is not adhered to the label 100 directly below. Third, once exposed, the adhesive strips 120 will not come in contact with any part of the laminating and converting machine 400 throughout the remaining steps in the manufacturing process, except for those parts intended to contact the adhesive strips 120, such as the second die cutter 441, which has a non-stick coating 442 applied to its surfaces. Finally, the adhesive strips 120 are preferably placed over the relief perforations 103 created at the first die station 431, thus reinforcing the relief perforations 103 so that the labels 100 preferably do not tear. After application of the adhesive strips 120, the web of material 140 enters a second nip roller station 432, which controls tension and alignment of the web of material 140.

According to the embodiment depicted, the release liner 123 is next removed from the adhesive strips 120. The release liner 123 material is gathered and rewound using a first matrix rewind station 433. One skilled in the art will recognize that other embodiments of the present invention may include alternative adhesive strips known in the art, some of which may not necessitate the removal of the release liner 123. By way of example, the adhesive strip may be applied without the use of a release liner 123 by applying pattern-coating adhesive to the web of material 140.

Figure 10:
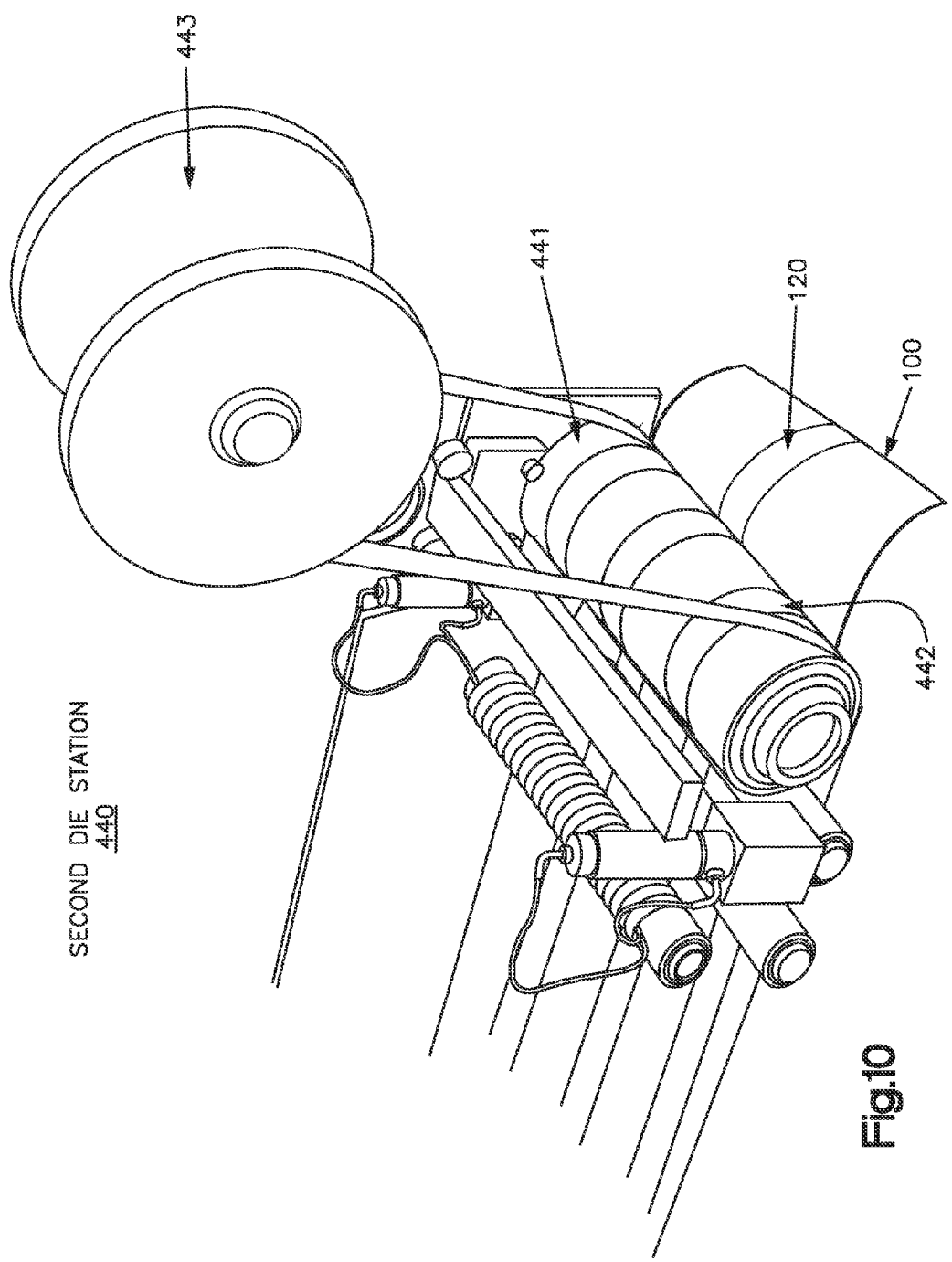
FIG. 10 is a perspective view of a second die station within the laminating and converting machine.

FIG. 10 shows the process steps associated with a second die station 440 within the laminating and converting machine 400. Specifically, FIG. 10 shows the web of material 140 undergoing cutting operations performed by a second die cutter 441. The second die cutter 441 generally trims the web of material 140, including the adhesive strips 120, into individual labels 100 with adhesive strip 120 backings. The second die cutter 441 used in the second die station 440 is designed to produce a particular size and configuration of labels 100. According to the embodiment, a non-stick coating 442 is applied to the second die cutter 441 to prevent the exposed adhesive strips from adhering to the second die cutter 441. A second matrix rewind station 443 gathers and rewinds the excess first lamination material 112, second lamination material 114, and paper substrate 111 that is trimmed away.

Figure 11:
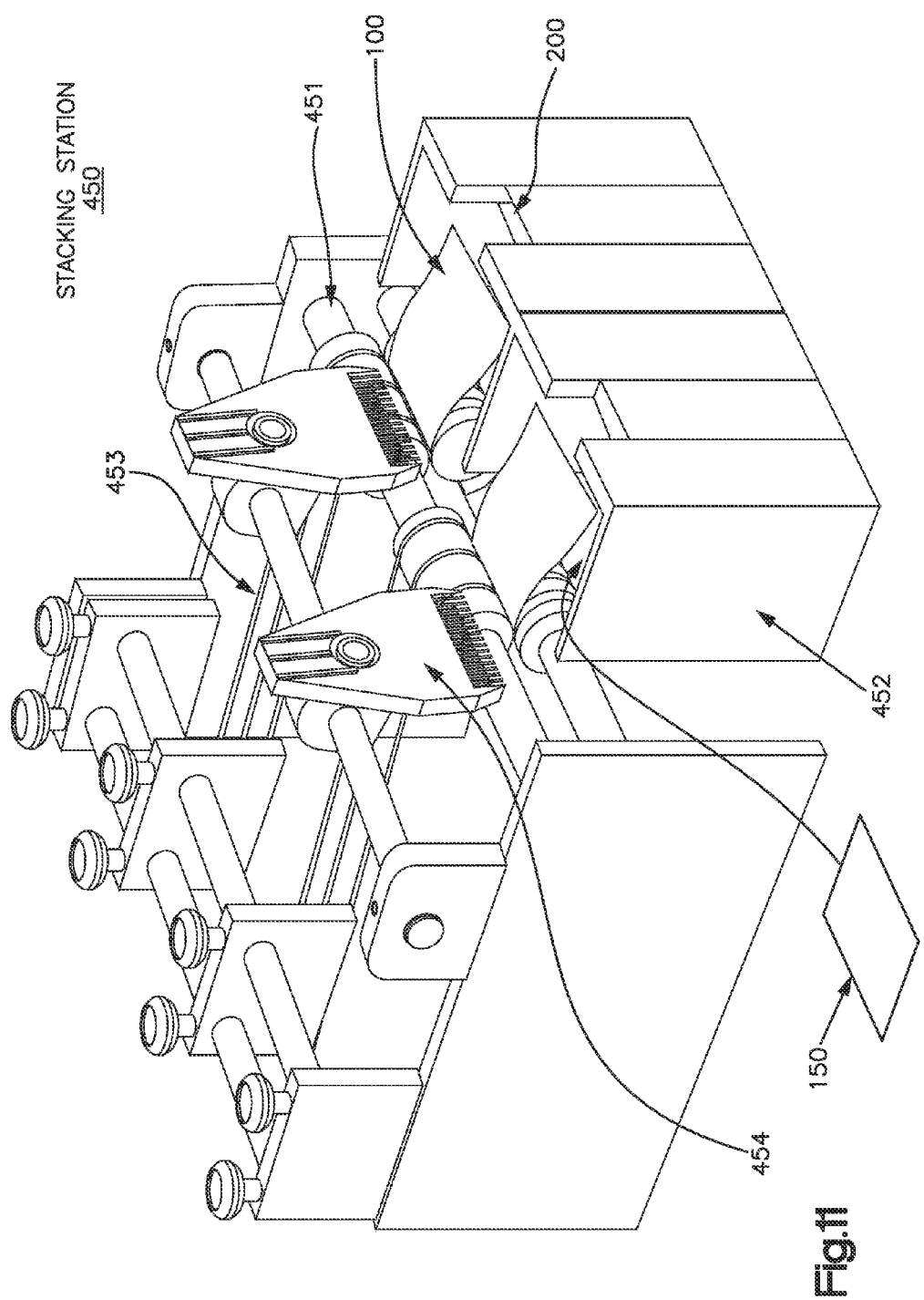
FIG. 11 is a perspective view of a stacking station within the laminating and converting machine.

FIG. 11 shows the process steps associated with a stacking station 450 within the laminating and converting machine 400. Specifically, FIG. 11 shows a series of belts and rollers 451 transporting the labels 100 into a stacking tray 452 that lowers the pad of labels 200 as the labels 100 accumulate. The series of belts and rollers 451 are strategically placed so as not to contact the exposed adhesive of the adhesive strips 120. Precision side guides 453 control the side-to-side registration of the labels 100 as they move along the transport belts and rollers 451. Downward air flow 454 directs the labels 100 onto the pad 200 accumulating in the stacking tray 452. Alternatively, mechanical or electro-mechanical devices may handle and accurately place the labels 100 into stacks 200. The adhesive strip 120 on the bottom surface of each label 100 adheres to the top surface of the label 100 below it, resulting in a pad 200 of peel-and-stick labels 100.

Finally, at variable or fixed intervals, a backer 150 may be placed into the stacking tray 452 to separate multiple pads of labels 100. The backer 150 typically includes a release agent coating so that the adhesive strip 120 on the bottom surface of the bottom-most label 100 in the pad 200 may be easily removed from the backer 150. The backer 150 may include printed data, including without limitation, the store for which the labels 100 are intended and the location or locations within the store where the labels 100 are to be installed.

Alternatively, an embodiment of the present invention includes a method of making a pad of labels 200, following the same steps described above, except that the second die station 440 trims the sheet of paper substrate 111 from the web of material 140 so that the resulting product is in a sheet format. These sheets may then be arranged into pads of sheets before being trimmed into pads 200 of peel-and-stick labels 100 through an off-line process that cuts the pad of sheets into pads of labels 200.

Further, the printing, cutting, and padding processes described above and depicted in FIGS. 6-11 may be controlled by taking into account the store's planogram, such that the finished pad of labels 200 are sequenced according to the store's planogram. Thus, the store personnel tasked with installing the labels 100 need only walk down a store aisle, peeling the labels 100 from the pad 200, and affixing them to the store shelves 102.

In an effort to ensure antecedent basis for the recitations included in the claims below, certain claims have been copied and pasted below, and rewritten in the paragraphs below to ensure a person of ordinary skill in the art understands the aspects of the embodiments of present invention as described above.

An embodiment of the present invention is directed to a pad of labels for use in a retail store. The "retail store" as used in the specification and more importantly in the claims is not limited to a specific type of store and include commercial and other types of stores where products are sold on shelves and peel and stick labels are used to identify the product being sold to a consumer. The pad of labels includes a plurality of labels removably attached to form the pad, where each label comprises a substrate having display information printed on a top surface thereof; an adhesive strip applied to a bottom surface of the label; and a release coating applied to the top surface of the label, where the adhesive strip is removably affixed to the release coating, and where the plurality of labels are sequenced according to the retail store's planogram. The release coating comprises silicone, and preferably the release coating covers the entire surface. The adhesive strip preferably includes double-coated tape having a width in the range of approximately ⅝ inch to 1 inch. For each label, the adhesive strip is permanently applied to the bottom surface of the label in an area that corresponds with a first portion of the label to be affixed to a store shelf. The display information is preprinted on the substrate. The substrate comprises paper, vinyl, plastic films or foils, fabrics, or textiles. The labels are preferably three-inches long and two-inches wide, and are preferably peel and stick labels. The display information includes a plurality of quadrants of information comprising quadrant A General Product Information, quadrant B Unit Price Information, and quadrant C Specific Product Information. The quadrant A information is included in a substantially square box disposed on a lower portion of the label. The substantially square box is approximately 1½-inches long and 1⅝-inches wide, and includes an approximate 3/16-inch border from the lowest horizontal section of the square to an edge E1 of the label and a ⅛-inch border and a 3/16-inch border from the sides of the square to edges E2 and E3, respectively. The quadrant A information includes "Buy One, Get One Free!," "Clearance, $1.00, While Supplies Last," "New Item," or "Sale $xx, You Save $xx," with the "xx" information preferably including certain pricing information. The quadrant B information is included in a substantially rectangular box disposed in an upper right portion of the label having a shaded rectangular box therein with a horizontal line directly above the shaded rectangular box. The substantially rectangular box is preferably approximately ¾-inch wide and approximately 15/16-inch long, and includes an approximate ⅛-inch border B2 to edge E2 and an approximate ⅜-inch border B4 to edge E4. A unit price of information included within the shaded rectangular box is preferably disposed on at least three horizontal lines comprising "UNIT PRICE" on a first line, a specific unit price on a second line, and on a third line words indicating a unit of measure. The quadrant C information is preferably included in a substantially rectangular box disposed in an upper left portion of the label having a bar code within the rectangular box. The substantially rectangular box is approximately ¾-inch wide and approximately 15/16-inch long, and includes an approximate 3/16-inch border B3 to edge E3 and an approximate ⅜-inch border B4 to edge E4. The bar code is preferably horizontal and has an approximate width of ¾ inch.

Another embodiment of the present invention is directed to a pad of labels for use in a retail store comprising a plurality of labels removably attached to form the pad, each label comprising a substrate having display information printed on a top surface thereof; an adhesive strip applied to a bottom surface of the label; and a release coating applied to the top surface of the label, where the adhesive strip is removably affixed to the release coating, where the plurality of labels are sequenced according to the retail store's planogram, and where the display information includes a plurality of quadrants of information including a quadrant A having General Product Information disposed in a lower portion of the label, a quadrant B having Unit Price Information disposed in an upper right portion of the label, and a quadrant C having Specific Product Information disposed in a disposed in an upper left portion of the label.

Yet another embodiment of a label for use in a retail store comprises a substrate having display information on a top surface thereof; a first layer of lamination material adhesively affixed to a bottom surface of the substrate; an adhesive strip applied to a bottom surface of the first layer of lamination material; and a second layer of lamination material adhesively affixed to the top surface of the substrate, where the second layer of lamination material includes a release coating applied to a top surface thereof. The first layer of lamination material comprises a layer of polypropylene or polyester film. The polypropylene or polyester film is clear. The second layer of lamination material comprises a layer of polyester film having a gauge thickness of 92 or 102. The adhesive strip is permanently applied to the bottom surface of the first layer of lamination material in an area corresponding with a first portion of the label to be affixed to a store shelf.

Another embodiment of the present invention is directed to a method of making a pad of labels comprising printing display information on a top surface of a substrate; affixing a first layer of lamination material to a bottom surface of the substrate; affixing a second layer of lamination material to the top surface of the substrate, the second layer of lamination material having a release coating applied to a top surface thereof; applying an adhesive strip to a bottom surface of the first layer of lamination material; cutting the substrate having first and second layers of lamination material affixed into at least one label; and arranging the at least one label into a pad of labels, where the printing, cutting, and arranging steps are controlled with reference to a store's planogram, such that the pad of labels are sequenced according to the store's planogram. The affixing steps include using adhesive. The adhesive strip is permanently applied to the bottom surface of the first layer of lamination material in an area corresponding with a first portion of the label to be affixed to a store shelf. The method includes cutting at least one relief perforation into the substrate having first and second layers of lamination material affixed. The adhesive strip is preferably permanently applied after cutting the at least one relief perforation, and over the at least one relief perforation, thus reinforcing the at least one relief perforation.

Yet another embodiment of the method of making a pad of labels includes printing display information on a top surface of a substrate; affixing a first layer of lamination material to a bottom surface of the substrate; affixing a second layer of lamination material to the top surface of the substrate, the second layer of lamination material having a release coating applied to a top surface thereof; applying at least one adhesive strip to a bottom surface of the first layer of lamination material; cutting the substrate having first and second layers of lamination material affixed into at least one sheet; arranging the at least one sheet into a pad of sheets; and cutting the pad of sheets into at least one pad of labels, where the printing, cutting, and arranging steps are controlled with reference to a store's planogram, such that the pad of labels are sequenced according to a store's planogram. In the preferred method, the at least one adhesive strip is permanently applied to the bottom surface of the first layer of lamination material in an area corresponding with a first portion of the label to be affixed to a store shelf. The method further comprises cutting at least one relief perforation into the substrate having first and second layers of lamination material affixed, wherein the at least one adhesive strip is permanently applied after cutting the at least one relief perforation, and over the at least one relief perforation, thus reinforcing the at least one relief perforation.

Another embodiment of the present invention is directed to a method of making a pad of labels comprising printing display information on a top surface of a substrate; loading the substrate into a friction feeder; transporting the substrate along a registration-and-transport table, where the registration-and-transport table comprises guides to control the orientation of the substrate; and sensors to detect the location of a leading edge of the substrate; adjusting the speed of transporting the substrate along the registration-and-transport table in response to the sensors detecting the location of the leading edge of the substrate, in order to ensure the substrate has proper registration as it enters a first nip roller station; entering the substrate into a web of material created at the first nip roller station, where the web of material comprises a first layer of lamination material adhered to a bottom surface of the substrate; and a second layer of lamination material adhered to a top surface of the substrate, the second layer of lamination material having a release coating applied to a top surface thereof, maintaining a tension in the web of material through use of a tensioning station; controlling the orientation of the web of material, including the substrate suspended within the web of material, through use of a web control guide; applying at least one adhesive strip to a bottom surface of the first layer of lamination material; cutting the web of material into at least one label; transporting the at least one label to a stacking station; and arranging the labels into a pad of labels, wherein the printing, cutting, and arranging steps are controlled with reference to a store's planogram, such that the labels within the pad of labels are sequenced according to a store's planogram. The at least one adhesive strip is permanently applied to the bottom surface of the first layer of lamination material in an area corresponding to a first portion of the label to be affixed to a store shelf. The method includes cutting at least one relief perforation into the web of material. The at least one adhesive strip is preferably permanently applied after cutting the at least one relief perforation, and over the at least one relief perforation, thus reinforcing the at least one relief perforation.

Another embodiment of the present invention is directed to a method of installing labels on a store shelf comprising obtaining a pad of labels from a container, where each label includes a substrate having display information printed on a top surface thereof; an adhesive strip applied to a bottom surface of the label; and a release coating applied to the top surface of the label; peeling a label from the pad of labels; affixing the label to a shelf; where, before peeling, the adhesive strip is removably affixed to the release coating; and where the labels in the pad are sequenced according to a retail store's planogram.

LIST OF REFERENCE NUMERALS

| | |
|---|---|
| 100 | label |
| 101 | display information |
| 102 | store shelf |
| 103 | relief perforations |
| 104 | first portion to be affixed to store shelf |
| 105 | second portion to hang below store shelf |
| 111 | paper substrate |
| 112 | first layer of lamination material |
| 113 | adhesive |
| 114 | second layer of lamination material |
| 115 | release coating |
| 120 | adhesive strip |
| 121 | polyester film |
| 122 | adhesive |
| 123 | release liner |
| 130 | edge of a sheet of paper substrate |
| 140 | web of material |
| 141 | edge of a web of material |
| 150 | backer |
| 200 | pad of labels |
| 300 | installation process |
| 301 | shipping container |
| 400 | laminating and converting machine |
| 410 | feeding and registration station |
| 411 | bottom-fed friction feeder |
| 412 | belting |
| 413 | registration-and-transport table |

| | |
|---|---|
| 414 | adjustable guides |
| 415 | sensors |
| 420 | laminating station |
| 421 | first nip roller station |
| 422 | first laminate station |
| 423 | second laminate station |
| 424 | web tensioning station |
| 425 | web control guide |
| 430 | first die station |
| 431 | first die cutter |
| 432 | second nip roller station |
| 433 | first matrix rewind station |
| 440 | second die station |
| 441 | second die cutter |
| 442 | non-stick coating |
| 443 | second matrix rewind station |
| 450 | stacking station |
| 451 | series of belts and rollers |
| 452 | stacking tray |
| 453 | precision side guides |
| 454 | downward air flow |

The list of reference numerals is provided for convenience and is intended to aid understanding of the illustrated embodiments described above. The embodiments of the present invention may be described in many different forms and should not be construed as limited to the illustrated embodiments. Likewise, the list above setting forth the reference numerals and associated components comprising the illustrated embodiments do not limit the scope of the invention as recited in the claims below.

We claim:

1. A pad of labels for use in a store comprising:
a plurality of labels removably attached to form the pad, each label comprising:
a substrate having display information printed on a top surface thereof;
an adhesive strip applied to a bottom surface of the label;
a release coating applied to the top surface of the label; and
a relief perforation configured to maintain the substrate in a substantially planar shape, the adhesive strip covering the relief perforation to reinforce the relief perforation,
wherein the adhesive strip on a first label corresponding to a first product is removably affixed to the release coating on a second label corresponding to a second product, and the first product is adjacent the second product according to the store's planogram.

2. The pad of labels according to claim 1, wherein the release coating comprises silicone.

3. The pad of labels according to claim 1, wherein the release coating covers the entire surface.

4. The pad of labels according to claim 1, wherein the adhesive strip includes double-coated tape having a width in the range of ⅝ inch to 1 inch.

5. The pad of labels according to claim 1, wherein for each label, the adhesive strip is permanently applied to the bottom surface of the label in an area that corresponds with a first portion of the label to be affixed to a store shelf.

6. The pad of labels according to claim 1, wherein the release coating is disposed above the display information printed on the top surface of the substrate.

7. The pad of labels according to claim 1, wherein the substrate comprises paper, vinyl, plastic films or foils, fabrics, or textiles.

8. The pad of labels according to claim 1, wherein the labels are three-inches long and two-inches wide, and are peel and stick labels.

9. The pad of labels according to claim 1, wherein the display information includes a plurality of quadrants of information comprising quadrant A General Product Information, quadrant B Unit Price Information, and quadrant C Specific Product Information.

10. The pad of labels according to claim 9, wherein the quadrant A information is included in a substantially square box disposed on a lower portion of the label.

11. The pad of labels according to claim 10, wherein the substantially square box is approximately 1½-inches long and 1⅝-inches wide, and includes an approximate 3/16-inch border from the lowest horizontal section of the square to an edge E1 of the label and a ⅛-inch border and a 3/16-inch border from the sides of the square to edges E2 and E3, respectively.

12. The pad of labels according to claim 9, wherein the quadrant A information includes "Buy One, Get One Free!," "Clearance, $1.00, While Supplies Last," "New Item," or "Sale $xx, You Save $xx."

13. The pad of labels according to claim 9, wherein the quadrant B information is included in a substantially rectangular box disposed in an upper right portion of the label having a shaded rectangular box therein with a horizontal line directly above the shaded rectangular box.

14. The pad of labels according to claim 13, wherein the substantially rectangular box is approximately ¾-inch wide and approximately 15/16-inch long, and includes an approximate ⅛-inch border B2 to edge E2 and an approximate ⅜-inch border B4 to edge E4.

15. The pad of labels according to claim 13, wherein a unit price of information included within the shaded rectangular box is disposed on at least three horizontal lines comprising "UNIT PRICE" on a first line, a specific unit price on a second line, and on a third line words indicating a unit of measure.

16. The pad of labels according to claim 9, wherein the quadrant C information is included in a substantially rectangular box disposed in an upper left portion of the label having a bar code within the rectangular box.

17. The pad of labels according to claim 16, wherein the substantially rectangular box is approximately ¾-inch wide and approximately 15/16-inch long, and includes an approximate 3/16-inch border B3 to edge E3 and an approximate ⅜-inch border B4 to edge E4.

18. The pad of labels according to claim 16, wherein the bar code is horizontal and has an approximate width of ¾ inch.

19. A pad of labels for use in a store comprising:
a plurality of labels removably attached to form the pad, each label comprising:
a substrate having display information printed on a top surface thereof;
an adhesive strip applied to a bottom surface of the label;
a release coating applied to the top surface of the label, disposed above the display information printed on the top surface of the substrate; and
a relief perforation configured to maintain the substrate in a substantially planar shape, the adhesive strip covering the relief perforation to reinforce the relief perforation,
wherein the adhesive strip on a first label corresponding to a first product is removably affixed to the release coating on a second label corresponding to a second product, and the first product is adjacent the second product according to the store's planogram.

20. A pad of labels for use in a store comprising:
a plurality of labels removably attached to form the pad, each label comprising:
a substrate having display information printed on a top surface thereof;
an adhesive strip applied to a bottom surface of the label;

a release coating applied to the top surface of the label, disposed above the display information printed on the top surface of the substrate; and at least one relief perforation configured to maintain the substrate in a substantially planar shape, the adhesive strip covering the relief perforation to reinforce the at least one relief perforation, wherein the adhesive strip on a first label corresponding to a first product is removably affixed to the release coating on a second label corresponding to a second product, and the first product is adjacent the second product according to the store's planogram, and wherein there is no release liner between the first label and second label.

21. The pad of labels according to claim 20, wherein the at least one relief perforation falls along a line approximately centered on a store shelf after the label is affixed to the store shelf.

22. The pad of labels according to claim 20, wherein the at least one relief perforation approximately bisects a first portion of the label, which is to be affixed to a store shelf.

23. The pad of labels according to claim 20, wherein the at least one relief perforation has a horizontal orientation after the label is affixed to a store shelf.

24. The pad of labels according to claim 20, wherein the display information includes a plurality of quadrants of information comprising quadrant A General Product Information, quadrant B Unit Price Information, and quadrant C Specific Product Information, wherein the at least one relief perforation approximately bisects both quadrants B and C, but not the area covered by quadrant A.

25. A pad of labels for use in a store comprising:
a plurality of labels removably attached to form the pad, each label comprising:
a substrate having display information printed on a top surface thereof;
a first layer of lamination material adhesively affixed to a bottom surface of the substrate;
an adhesive strip applied to a bottom surface of the first layer of lamination material;
a second layer of lamination material adhesively affixed to the top surface of the printed substrate, disposed above the display information printed on the top surface of the substrate;
a release coating applied to a top surface of the second layer of lamination material; and
at least one relief perforation configured to maintain the substrate in a substantially planar shape, the adhesive strip covering the relief perforation to reinforce the at least one relief perforation,
wherein the adhesive strip on a first label corresponding to a first product is removably affixed to the release coating on a second label corresponding to a second product, and the first product is adjacent the second product according to the store's planogram, and
wherein there is no release liner between the first label and second label.

26. The pad of labels according to claim 25, wherein the first layer of lamination material comprises a layer of polypropylene or polyester film.

27. The pad of labels according to claim 26, wherein the polypropylene or polyester film is clear.

28. The pad of labels according to claim 25, wherein the second layer of lamination material comprises a layer of clear polypropylene or polyester film having a gauge thickness of 92 or 102.

29. The pad of labels according to claim 25, wherein the adhesive strip is permanently applied to the bottom surface of the first layer of lamination material in an area corresponding with a first portion of the label to be affixed to a store shelf.

30. The pad of labels according to claim 25, wherein the second layer of lamination material is pre-coated on a first surface with a silicone release coating, and the second layer of lamination material is adhesively affixed to the printed substrate using a layer of adhesive applied to either a second surface of the second layer of lamination material, opposite the first surface, or to the top surface of the printed substrate.

31. A pad of labels for use in a store comprising:
plurality of labels removably attached to form the pad, each label comprising:
a substrate having display information printed on a top surface thereof;
a first layer of lamination material adhesively affixed to a bottom surface of the substrate;
an adhesive strip applied to a bottom surface of the first layer of lamination material;
a second layer of lamination material adhesively affixed to the top surface of the printed substrate, disposed above the display information printed on the top surface of the substrate;
a release coating applied to a top surface of the second layer of lamination material, and
a relief perforation configured to maintain the substrate in a substantially planar shape, the adhesive strip covering the relief perforation to reinforce the relief perforation;
wherein the adhesive strip on a first label is removably affixed to the release coating on a second label.

32. The pad of labels of claim 31, further comprising:
an adhesive strip including a first adhesive layer, a polyester film, and a second adhesive layer, a top surface of the first adhesive layer contacting a bottom surface of the first layer of lamination material, a top surface of the polyester film contacting a bottom surface of the first adhesive layer, and a top surface of the second adhesive layer contacting a bottom surface of the polyester film.

33. The pad of labels of claim 32, the adhesive strip having a width ranging from ⅝ inch to 1 inch from a first end of the adhesive strip to a second end of the adhesive strip, the width of the adhesive strip being less than a width of the first lamination material layer, the first end of the adhesive strip being about ⅛ inch from a plane defined by an edge of the first lamination material layer and the second end of the adhesive strip being farther from the plane than the first end of the adhesive strip.

* * * * *